United States Patent [19]

Namikas et al.

[11] 4,097,183
[45] Jun. 27, 1978

[54] METHOD OF AND APPARATUS FOR CONTROLLING BY-PASS VALVE

[75] Inventors: Daumantas Namikas, Walnut Creek, Calif.; Takao Kuwabara, Hitachi, Japan

[73] Assignees: Bechtel International Corporation, San Francisco, Calif.; Hitachi, Ltd., Tokyo, Japan

[21] Appl. No.: 704,031

[22] Filed: Jul. 9, 1976

[51] Int. Cl.$^2$ .............................................. F01D 19/00
[52] U.S. Cl. .......................................... 415/1; 415/28
[58] Field of Search ................................. 415/1, 17, 28

[56] References Cited

U.S. PATENT DOCUMENTS

| | | | |
|---|---|---|---|
| 2,646,812 | 7/1953 | Rheingaws et al. | 415/17 |
| 3,275,293 | 9/1966 | Hosogai et al. | 415/1 |
| 3,339,567 | 9/1957 | Fukasu et al. | 415/1 |
| 3,452,962 | 7/1969 | Willi | 415/1 |
| 3,658,436 | 4/1972 | Oishi et al. | 415/1 |
| 3,682,563 | 8/1972 | Takashima | 415/1 |
| 3,886,373 | 5/1975 | Okada | 415/1 |

FOREIGN PATENT DOCUMENTS 1,453,771  11/1963  Germany .............................. 415/1

*Primary Examiner*—C. J. Husar
*Attorney, Agent, or Firm*—Craig & Antonelli

[57] ABSTRACT

Provided is a method of controlling a by-pass valve in which the discharge valve is opened or closed in an interlocked relation with a turbine flow regulating means such as wicket gates of a water-turbine in order to bypass a stream of water with respect to the turbine in synchronism with the movement of wicket gates, thereby decreasing pressure fluctuation in a penstock of the turbine during transient conditions of operation, and is eventually closed when the wicket gates are held in an equilibrium state, thereby eliminating prolonged wasting of the available water.

13 Claims, 4 Drawing Figures

METHOD OF AND APPARATUS FOR CONTROLLING BY-PASS VALVE

BACKGROUND OF THE INVENTION

The present invention relates to a method of and apparatus for controlling a by-pass valve for regulating the pressure in a penstock of a water-turbine when the water-turbine is operating in turbine mode.

A by-pass valve is fitted to a penstock or a casing of a water-turbine. This valve is required to cause some portion of the water supplied to the water-turbine to be directly discharged from the penstock to the downstream side of the water-turbine, thereby reducing a change in water pressure within the penstock when the wicket gates are moved toward a closed or opened position to regulate the flow rate of water introduced into the turbine runner.

There are two kinds of commonly known methods for controlling by-pass valves.

The first method consists of maintaining a by-pass valve in a closed position under normal operating conditions of the water-turbine and opening the by-pass valve to pressurized water from the penstock when the wicket gates of the turbine are moved toward a closed position. Following this the closing of the by-pass valve must be sufficiently slow in order not to cause excessive pressure increase within the penstock when said wicket gates reach their equilibrium state at the required adjusted opening. The second method of controlling a by-pass valve is to use a valve which is opened inversely with the closing of the wicket gates and which can be increased or decreased in its opening degree in response to the opening or closing action of said wicket gates so that the sum of the flow rate of water passing through said wicket gates and the flow rate of water releasing from the by-pass valve is maintained at a constant rate.

The above mentioned conventional control methods have respective advantages and disadvantages. With the first control method the available water is not wasted since the by-pass valve is held closed as long as the wicket gates do not move toward their closed position. Additionally the valve is held in its fully closed position even when the wicket gates move toward their opened position. The valve cannot be moved in its closing motion synchronously in response to the opening action of the wicket gates because this kind of by-pass valve operation is arranged to close at a very slow speed as mentioned above.

In the latter mentioned control method, the by-pass valve may be opened or closed at a suitable rate of speed cooperatively responsive to the opening or closing action of the wicket gates. This is required to maintain the sum of the flow rate of water passing through the wicket gates and the flow rate of water released from the valve at a constant rate. As a result, the water pressure within the penstock does not significantly fluctuate and thus the whole control system operates in an extremely stable condition. However, the by-pass valve is kept open at a predetermined degree of opening even after the opening or closing action of the wicket gates is terminated. Thereby large amounts of available water are continuously wasted. Accordingly, the latter method would waste energy, but it could be used when constant discharge needs to be maintained. Generally, wicket gates are varied in their orientation in response to a change in load, and when this occurs, water pressure fluctuates due to water hammering phenomena in the penstock, so that it becomes difficult to control the rotational speed of the turbine runner with the result that a control system for a water turbine is unstable in operation.

In view of this, the by-pass valve needs to be opened or closed in synchronism with the opening or closing of the wicket gates. Accordingly, it is desirable that the flow rate of water passing through the wicket gates and extent of the fluctuation of the water pressure within the penstock be suitably controlled prior to the occurence of the fluctuation of water pressure produced by the opening or closing of the wicket gates.

SUMMARY OF THE INVENTION

The object of the present invention is to provide a method and apparatus for controlling a discharge valve whereby wasteful prolonged consumption of available water is avoided and at the same time the stability of water pressure is maintained. According to the present invention the by-pass valve is cooperatively opened or closed in response to the closing or opening action of the wicket gates. The valve is returned to its fully closed position at a sufficiently slow rate of speed in order to minimize the pressure increase within the penstock after the motion of the wicket gates is stabilized.

DESCRIPTION OF THE PREFERRED EMBODIMENTS

Figure 1:
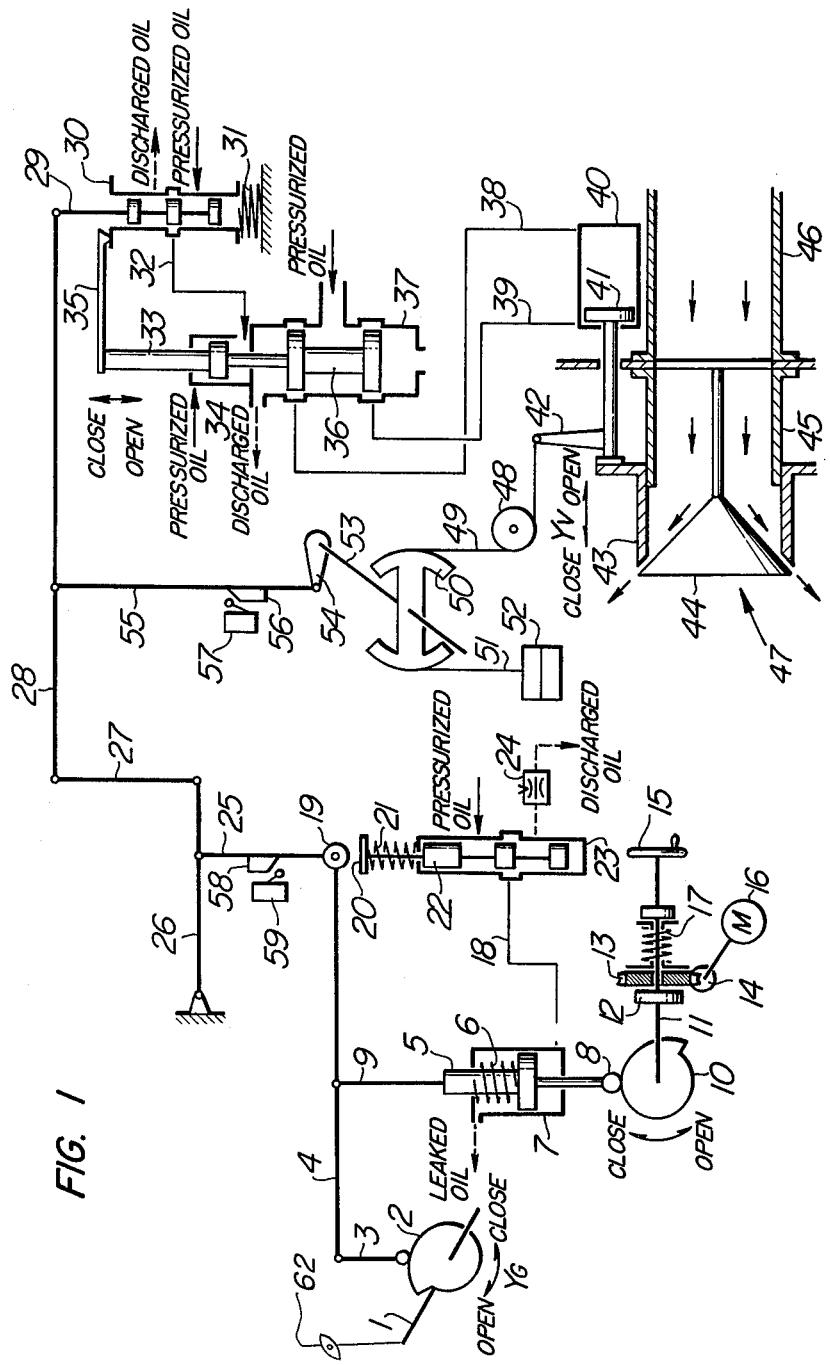
FIG. 1 is a system diagram showing the control operation of the present invention.

Referring to the accompanying drawings, in which there are shown the control operation of a system for controlling a by-pass valve and a relationship between the opening degree of wicket gates and the opening degree of the by-pass valve. Reference numeral 1 designates a shaft which rotates in cooperation with the opening or closing action of the wicket gates 62, as shown in FIG. 1A. A cam 2 shaped to directly reflect the position of the wicket gates is mounted on the shaft 1. The lower end portion of a cam follower 3 is in contact with the outer peripheral surface of the cam 2, while the upper end portion of the cam follower 3 is pivotally connected to one end of a horizontal extension lever 4 which is provided with a roller 19 at the other end thereof. A rod 9 extends from the upper end of a bias piston 5 and is pivotally connected to the center portion of the horizontal extension lever 4, and the bias piston 5 is continuously biased in a downward direction by a spring 6. Roller 8 attached to the lower end of the piston 5 is in contact with the outer peripheral surface of a bias cam 10. The bias piston 5 is contained in a bias cylinder 7 and is hydraulically moved in an upward direction by the oil pressure, introduced into the lower portion of the bias cylinder 7. The bias cam 10 is mounted on a shaft 11 by the actuation of an electric motor 16 through a driving mechanism or by the manual operation of a hand wheel 15 secured to the shaft 11. The driving mechanism includes a worm 14 secured to the shaft 11. The driving mechanism includes a worm 14 secured to the output shaft of the motor 16, a worm wheel 13 adapted to engage with the worm 14 and rotatably journaled on the shaft 11, a collar 12 secured to the shaft 11, and a spring 17 mounted on the shaft 11 and so as to bias the worm wheel 13 against the collar 12. An oil tube 18 communicates the lower portion of the bias cylinder 7 with a change-over valve which comprises a plunger 22, a stop plate 20 fixed on the end of plunger 22, a sleeve 23 which contains the plunger 22, and a spring 21 mounted between the stop plate 20 and the sleeve 23 for continuously forcing the plunger 22 to the upper portion of the sleeve 23. The sleeve 23 of the change-over valve is provided with an inlet connection for pressurized oil and a discharge connection for return oil. The discharge connection is provided with a throttle valve 24. The roller 19 is connected to the junction of the right-hand end (as viewed in FIG. 1) of lever 4 and the lower end of a link 25 having a cam 58 mounted on an intermediate portion thereof. The cam 58 actuates a limit switch 59 when the link 25 moves to the downward position. When the limit switch 59 is actuated, the electric motor 16 is rotated in one direction. The upper end of the link 25 is connected to a lever 26 at its intermediate portion. The left end of the lever 26 pivots on a fixed member while the other end thereof is connected to the lower end of a link 27. The upper end of the link 27 is connected to the left end of a horizontal lever 28 having the right end connected to a plunger 29. This plunger 29 constitutes an oil pressure distributor valve together with a sleeve 30 for containing the plunger 29 and a spring 31 continuously biasing the sleeve 30 in upward direction. The oil pressure distributor valve is connected to pilot valve cylinder 34 of a main oil pressure distributor valve 37 through an oil connection 32. This oil connection 32 supplies pressurized oil by the changeover action induced by the upward movement of the plunger 29 or the downward movement of sleeve 30. Reference numeral 33 designates a piston of a pilot valve 34, which piston is integrally connected to a plunger 36 of the main oil pressure distributor valve 37. The main oil distributor valve 37 is continuously supplied with presurized oil which is directed into oil tubes 38 and 39 by the reciprocal movement of the plunger 36. A servo motor 40 contains a piston 41 which is reciprocatively moved by the action of pressurized oil fed through said oil tubes 38 and 39 to open or close a by-pass valve 47. The by-pass valve comprises a steel pipe 46 communicated with a penstock 61 of the water turbine 60, a by-pass liner 45 connected to the end of the steel pipe 46, a sleeve 43 slidably supported on the by-pass liner 45 and connected to the piston 41 of the servo motor 40, and a cone 44 adapted to cooperate with the sleeve 43. Reciprocatory movement of the piston 41 is also transmitted to a return sheave 50 through a length of wire 49 which connects the return sheave 50 with a return post 42 secured to the piston rod 41. Another length of wire 51 is connected to the other side of the return sheave 50, and attaches a counter weight 52. The return sheave 50 rotates a shaft 53 having a lever 54 secured thereto for transmitting the motion of the return sheave 50 to a link 55. The link 55 connects with the end of the lever 54 and with the intermediate portion of the horizontal lever 28. The link 55 also is provided with a cam 56 at its intermediate portion. A fixed limit switch 57 is provided to be actuated by the upward movement of the link 55 thereby to cause the rotation of the aforementioned electric motor 16 in one direction. The direction of the rotation brought about by the actuation of the limit switch 57 is the reverse direction of the rotation actuated by the limit switch 59.

In normal operation of the water-turbine, the wicket gates 62 remain open by a suitable amount while the by-pass valve 47 is maintained in its fully closed position. When a load applied on the water-turbine is decreased and the wicket gates are correspondingly moved toward their closed position, the movement of the wicket gates is transmitted to the shaft 1, causing it to rotate together with the cam 2 in the closing direction as shown by the arrow depicted in FIG. 1. Due to the rotation of the cam 2 in the closing direction, the cam follower 3 is lowered to cause the left end (as seen from FIG. 1) of the horizontal lever 4 to be lowered and to cause its right end to be raised. The lifting movement of the right-hand end of the lever 4 is transmitted through the link 25, lever 26 and link 27 to the horizontal lever 28 to cause the right-hand end thereof to be lowered. The plunger 29 is thus lowered and the oil connection 32 releases oil pressure from the underside of the pilot valve cylinder 34. At the same time pressurized oil on top of the cylinder 34 lowers the piston 33 together with the plunger 36. Pressurized oil contained in the main oil pressure distributor valve 37 is passed to the servo motor 40 through the oil line 39. This moves the piston 41 in right hand direction causing the sleeve 43 of the by-pass valve 47 to move in the opening direction. The downward movement of the piston 33 is followed by the lowering of the return arm 35, which forces down the sleeve 30 of the oil pressure distributor valve. As a result, relative displacement between the sleeve 30 and the plunger 29 occurs to isolate the oil connection 32 from the discharge side of the oil pressure distributor valve. When the oil connection 32 is isolated from the discharge side of the oil pressure distributor valve, the sleeve 30 is no longer forced down by the arm 35 and thus stops its downward movement. Downward movement and stopping of the sleeve 30 successively take place resulting in repeated stepwise lowering of the sleeve 30.

Consequently, delay time in opening operation of the by-pass valve 47 is determined in accordance with the degree of closing of the wicket gates 62.

Movement in the opening direction of the sleeve 43 of the by-pass valve 47 is transmitted through the return post 42, wire 49, return sheave 50, shaft 53 and lever 54 to permit the link 55 to be raised and subsequently to permit the right end of the horizontal lever 28 to be moved upward thereby raising the plunger 29. As a result, the plunger 29 which has been lowered by the closing action of the wicket gates is returned to its original position by the opening operation of the by-pass valve 47. Opening degree of the by-pass valve 47 (i.e. opening degree of the sleeve 43) is thus determined dependent upon the closing degree of the wicket gates 62.

Figure 1A:
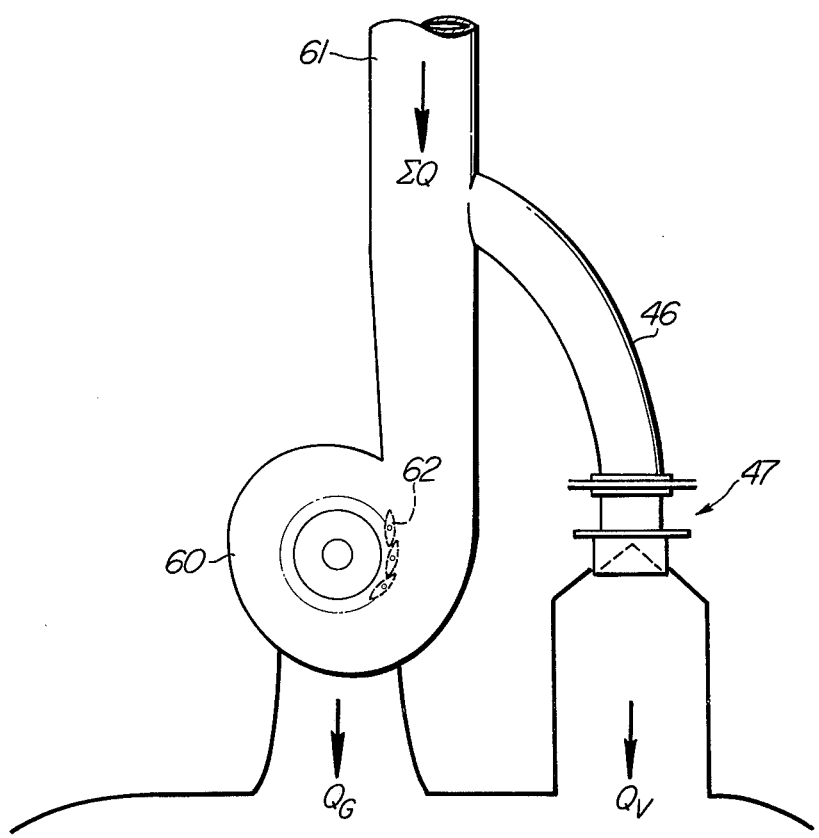
FIG. 1A is a diagrammatic view showing a typical arrangement of a discharge valve in the water turbine.

The limit switch 57 is actuated by the upward movement of the link 55 to energize the electric motor 16 which in turn causes the cam 10 to rotate clockwise as shown in FIG. 1. The clockwise movement of the cam 10 causes the roller 8 and thus the piston 5 to be lowered by the compression force of the spring 6. The downward speed of the piston 5 is determined by the discharge rate of the oil from the cylinder 7 through the oil connection 18 and the throttle valve 24. The piston 5 moves downward such that the roller 19 is accordingly moved downward until it pushes down the plunger 22 by hitting the stop plate 21 and the plunger 22 covers the discharge port and instead uncovers the pressurized oil port. The position of the roller 19 at this instant corresponds to a resultant zero percent opening degree of the by-pass valve 47. Thus, the downward movement of the piston 5 takes a prolonged period of time, say several minutes. The by-pass valve 47 is fully closed by the action of the horizontal levers 4, 26 and 28 and the other components of the system, which action follows the lowering movements of the piston 5 and the rod 9.

When the load applied on the water-turbine increases, the by-pass valve 47 is required to close slowly. When the load applied on the water-turbine increases during the reclosing process of the discharge valve 47 owing to the lowering action of the piston 5 as described above, the by-pass valve 47 is in this case, closed synchronously with opening motion of the wicket gates. As the cam 2 rotates in the clockwise direction, the left end of the horizontal lever 4 moves upward and the right end of the lever 4 moves downward. At the same time the links 25 and 27 moves downward, the left hand end of the horizontal lever 28 moves downward, and the right end of the lever 28 moves upward. Subsequently, the plunger 29 moves upward and the pressurized oil contained in the oil pressure distributor valve is passed to the pilot valve cylinder 34 of the main distributor valve 37 through the oil tube 32 to raise the piston 33 and the plunger 36. The pressurized oil contained in the main oil pressure distributor valve 37 is then fed to the servo motor 40 through the oil line 38 to cause the sleeve 43 of the by-pass valve 47 to move in the closing direction. This closing displacement of the sleeve 43 is controlled by the associated devices which include the return arm 35, the return post 42 and other components as mentioned before. The limit switch 59 is actuated by the downward movement of the link 25, thereby energizing the electric motor 16 which in turn permits the cam 10 to rotate counter clockwise. The rotating cam 10 in contact with the roller 8 pushes up the same until the switch 59 de-energizes the electric motor 16. When the opening degree of the wicket gates becomes stable thereafter, the by-pass valve is again slowly closed from the opened position so that the increase of water pressure in the penstock is controlled within the allowable range determined thereby. Since the sum of the water quantity passing through penstock 61 ($\epsilon$ Q) is distributed between flows through the wicket gates 62 ($Q_G$) and that through the by-pass valve 46 ($Q_v$). Also, when the opening degree of the wicket gates is varied, the discharge valve is opened or closed according to a relationship in terms of the opening degree, which relationship is previously set in response to the opening or closing action of the wicket gates. The two operations of the type described above are performed in separate operation systems, and the respective operation systems are combined so that the opening or closing action of the by-pass valve is preferentially performed in the latter type of operation.

Accordingly, the two operation systems are separately actuated in response to the change of the opening degree of the wicket gates and to the change of the opening degree of the by-pass valve, and can function as desired to exhibit the respective predetermined capabilities.

Figure 2:
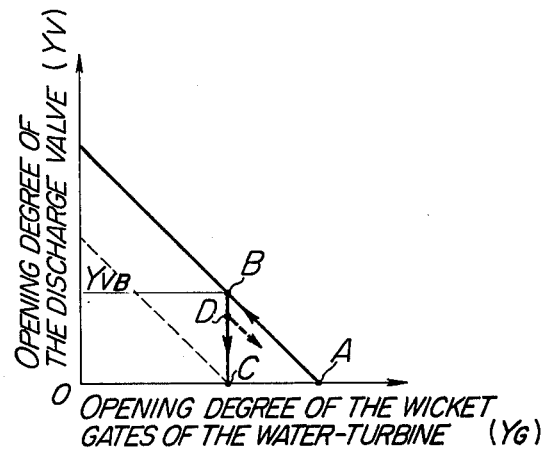
FIG. 2 is a graph showing the relation between the opening degree of the wicket gates and the opening degree of the by-pass valve employed in the control system of FIG. 1.

Referring now to FIG. 2, let the initial opening degree of the wicket gates YG be the value as illustrated by point A in the Figure and that of the by-pass valve 47 be zero. Assuming that the wicket gates begin to close to reach the opening degree illustrated by point C, the by-pass valve 47 is opened to take the value illustrated by point B while maintaining the predetermined relationship in terms of the opening degree with the wicket gates whereby increase in water pressure within the penstock caused by the closing operation of the wicket gates is suppressed. If the subsequent opening or closing operation of the wicket gates do not take place, then the by-pass valve begins to close very slowly. The by-pass valve is, of course, closed sufficiently slowly so as not to induce a substantial increase in pressure within the penstock which pressure exerts substantial influences on the components of the water-turbine.

If the wicket gates operate to open during the gradual closing movement of the by-pass valve, for instance at point D as illustrated, the closing speed of the by-pass valve is accelerated in response to the opening operation of the wicket gates to take an increased value along with the predetermined opening degree relation gradient as illustrated by a dotted line in the Figure.

In this embodiment, the by-pass valve is maintained at its closed position during normal operation of a water-turbine, so that available water is not wastefully consumed under normal operation. Moreover, the by-pass valve may be opened or closed responsive to either of the opening or closing operations of the wicket gates, so that increase and decrease in water pressure within the penstock may be properly regulated by controlling the relationship between $Q_v$ and $Q_G$.

Figure 3:
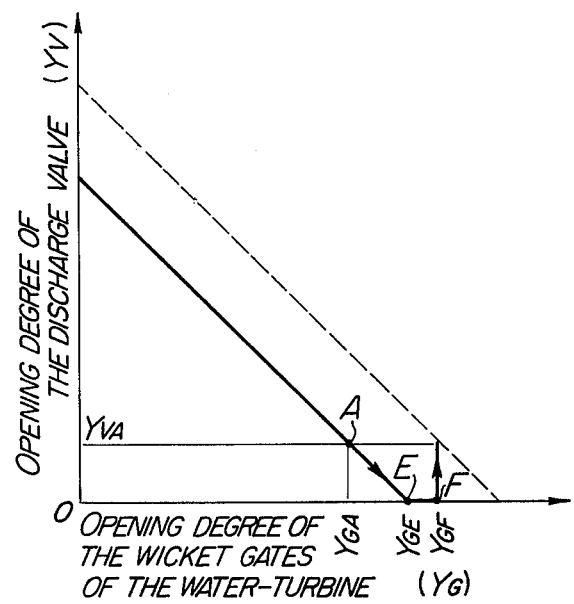
FIG. 3 is a graph showing the relation between the opening degree of the wicket gates and the opening degree of the by-pass valve employed in another embodiment of the present invention.

FIG. 3 is given to show a function of another embodiment of the invention wherein the amount of water discharged from the by-pass valve ($Q_v$) is regulated to a constant level within some limited range of fluctuation for preventing the occurrence of unstable state otherwise induced in the control system by pressure fluctuation, even when the wicket gates open at certain stable degree.

This second embodiment of the present invention may be practically realized by maintaining the opening degree of the by-pass valve 47 at a predetermined small degree by appropriately controlling the position of cam 10 said predetermined small degree being varied as desired according to a range of possible transient fluctuation of the wicket gates.

As described hereinbefore with reference to FIG. 1, in the former embodiment the closing operation by the rotation of the electric motor 16 may be actuated by the limit switch 57 continues until the sleeve 43 of the by-pass valve 47 is fully closed. In contrast thereto, in this second embodiment the limit switch 57 is set so as to be opened for stopping the operation of the motor 16 when the sleeve 43 is closed to have a predetermined small opening degree and still not to be fully closed.

As is operated in a manner mentioned above, when the wicket gates open to have the opening degree illustrated by point YGE starting from the condition where the opening degrees of the wicket gates and the by-pass valve are respectively YGA and YVA, as illustrated in FIG. 3, the by-pass valve is closed to its fully closed position retaining the predetermined relation in terms of opening degree with the wicket gates to bring the total flow rate to a constant level. Assuming that the wicket gates continue to open and are stable at an opening degree of YGF, then the by-pass valve is slowly restored to the original opening position YVA. This results from the operation of the electric motor 16 actuated by the limit switch 59.

Although some portions of available water is wastefully consumed in the second embodiment, the waste amount of water is very small. Yet, higher and stable follow-up characteristic responsive to the applied load may be obtained. For this reason, the second embodiment has high availability for this kind of control system.

In addition, according to the present invention, even if the load applied on the water turbine were varied, the stability of the control system for water turbine would be maintained due to the fact that pressure fluctuation is small in amount within the penstock when the by-pass valve is opened. Accordingly, the operation of water turbines can be stably controlled to improve the response characteristic of the governor.

What is claimed is:

1. A method of controlling a by-pass valve for use in combination with a penstock by means of a flow rate regulating device for regulating a quantity of water flowing through said penstock, said method comprising the steps of cooperatively opening or closing said by-pass valve in response to the operation of said flow rate regulating device to maintain the total quantity of water passing through said flow rate regulating device and said by-pass valve constant when said by-pass valve is opened, and closing said by-pass valve at a sufficiently slow speed not to induce an increase in water pressure within said penstock during the normal condition of operation in which said flow rate regulating device is opened at a stable opening degree.

2. A method of controlling a by-pass valve for use in combination with a penstock by means of a flow rate regulating device for regulating a quantity of water flowing through said penstock, said method comprising the steps of cooperatively opening or closing said by-pass valve in response to the operation of said flow rate regulating device to maintain the total quantity of water passing through said flow rate regulating device and said by-pass valve constant after said by-pass valve is opened in response to the operation of said flow rate regulating device, and closing said by-pass valve at a sufficiently slow speed not to induce an increase in water pressure within said penstock to enable the by-pass valve to be maintained in a predetermined small opening degree during the normal condition of operation in which said flow rate regulating device is opened at a stable opening degree, thereby maintaining said total quantity of water at a constant level irrespective of the possible occurrence of fluctuations during the time period in which said flow rate regulating device is opened at a stable opening degree.

3. A method of synchronous bypass control with a water saving control of a pressure regulator bypassing water for a hydraulic machine, said method comprising the steps of (1) opening the pressure regulator in response to a closing motion of a discharge adjusting means of the hydraulic machine to maintain the total discharge of the pressure regulator constant, (2) either opening or closing the pressure regulator in response to motion of the discharge adjusting means to maintain the total discharge constant after the discharge adjusting means becomes stable and until the pressure regulator is closed again, (3) bringing the pressure regulator back to the fully closed position during or after either step 1 or step 2 at an independently adjustable rate which will not have any substantial influence on the procedure of steps (1) and (2), in which continuous wasting of the available water is prevented, and (4) continuously arranging the pressure regulator during the opening motion of the discharge adjusting means in order that step 1 can be put into service immediately after the motion of the discharge adjusting means is reversed.

4. A method of the claim 3, wherein said step 3 comprises bringing the pressure regulator back to a predetermined position, the position being contributory to improve sustained stability of a synchronous bypass control means of the discharge adjusting means which is closed synchronously with possible occurrence of opening fluctuations of the discharge adjusting means and further comprising the step of (5) adjusting the pressure regulator back to said predetermined position at an independently adjustable rate which will not have any substantial influence on the predetermined position in step 3 when the pressure regulator is excessively closed.

5. A method of claim 3, wherein a desired opening signal of the pressure regulator is compared with an actual opening feedback signal of the pressure regulator, the balance signal between the two signals is supplied to a hydraulic power amplifier for serving to eliminate the balance signal, and wherein a wicket gate responsive synchronous bypass control signal, the water saving signal and the automatic opening bias control signal for the step 4 are combined to constitute the desired opening signal.

6. Control equipment for a hydraulic turbine, said equipment comprising (1) a synchronous bypass control means for maintaining the total discharge of the turbine and a pressure regulator constant during a closing motion of wicket gates of the hydraulic turbine and for subsequently settling down the wicket gates to a new position in an oscillatory mode, (2) a water saving bias means for bringing the pressure regulator to a fully closed position, after the settling-down of the wicket gates, at such a slow rate as not to leave any objectionable effect on the new equilibrium state of the synchronous bypass control means, and (3) an opening bias means for automatically adjusting the wicket opening to gate pressure regulator opening relationship for the total discharge setting to compensate for any sudden opening motion of the wicket gates so that the pressure regulator can respond to a sudden reversal of the motion of the wicket gates and reverse the synchronous bypass operation immediately, with the total discharge setting corresponding to the opening of the wicket gates from where the motion is reversed.

7. A control equipment of claim 6, wherein said water saving bias means functions to close the pressure regulator as long as the pressure regulator is opened and wherein the closing rate is so slow as not to leave any objectionable effect on the new equilibrium state of the synchronous bypass control means.

8. A control equipment of claim 6, further comprising a synchronous bypass control cam for producing a desired pressure regulator opening signal in response to the motion of wicket gates or a signal corresponding thereto to maintain the total discharge quantity constant, means for summing said pressure regulator signal and said wicket gate signal and producing a finally desired pressure regulator opening signal means for detecting the actual pressure regulator opening, means for comparing said finally desired opening signal and said actual opening signal and generating a balance signal, and a hydraulic power amplifier means for serving to decrease said balance signal to zero.

9. A method of controlling a by-pass valve which is connected to a penstock casing of a turbine and is arranged to permit a quantity of water supplied to the penstock to be bypassed around the turbine and discharged to the downstream side thereof in response to opening or closing of a water flow regulating means for the turbine, thereby suppressing water hammer phenomena within the penstock, said method comprising controlling the opening or closing of a bypass valve in synchronism with closing or opening of the water flow regulating means for the turbine in such a manner that the water flow rate through the penstock, which amounts to the sum of the water flow rate through the turbine and the water flow rate through the bypass valve, is maintained constant at all times except when further opening or closing by-pass valve motion is physically prevented by the valve being fully opened or closed, controlling the movement of the by-pass valve back to the fully closed position spontaneously at a very slow rate to cause substantially no change in water pressure within the penstock as long as the by-pass valve is opened such that preventing of water flow through the by-pass valve is possible in any equilibrium state.

10. A method of controlling a by-pass valve which is connected to a penstock or casing of a turbine and is arranged to permit a portion of water flow supplied to the penstock to be bypassed around the turbine and discharged to the downstream side thereof in response to opening or closing of a water flow regulating means for the turbine, thereby suppressing water hammer phenomena within the penstock, said method comprising controlling the opening or closing of the by-pass valve in synchronism with the closing or opening of the water flow regulating means for the turbine in such a manner that the water flow rate through the turbine and the water flow rate through the by-pass valve, is maintained constant at all times except when the by-pass valve is physically prevented from opening or closing further due to the valve being fully opened or closed, controlling the by-pass valve back to a predetermined partial opening degree spontaneously at a very slow rate to cause substantially no change in water pressure within the penstock as long as the by-pass valve is at a higher or a lower opening degree than said predetermined partial opening degree such that a partial water flow through the by-pass valve is possible in any equilibrium state, thereby providing capability for the by-pass valve to maintain said synchronous bypass control in a transient state even below said predetermined partial opening degree in any equilibrium state.

11. A method according to claim 10, including the steps of opening or closing of the by-pass valve by a combined signal of a first signal synchronously responsive to action of the flow regulating means in such a way that said first signal decreases as the flow regulating means opens and increases as the flow regulating means closes, and a second signal responsive to said combined signal or the actual opening degree of the by-pass valve, said second signal tending to cause the by-pass valve to move slowly toward a predetermined partial opening degree unless said combined signal is at a level corresponding to said predetermined partial opening degree or the by-pass valve is actually at said predetermined partial opening degree, controlling said second signal automatically in such a way that said combined signal is maintained at a level corresponding to the fully closed position of the by-pass valve even while the flow regulating means is continuously moving in an opening direction so that said combined signal can be increased at any time to open the by-pass valve instantaneously when the turbine flow regulating means suddenly changes direction of its motion for closing.

12. A method according to claim 11, wherein said combined signal of the by-pass valve is compared with an actual opening feedback signal of the by-pass valve and the balance signal between the two signals is supplied to a set of hydraulic power amplifiers in such a way that the by-pass valve is operated to eliminate the balance signal thereby.

13. A control method according to claim 11, wherein said bias signal is yielded by a servomotor to be controlled by a pilot valve, said pilot valve receiving said combined signal as its input to distribute a fluid to and from said servomotor, thereby operating said servomotor very quickly in an opening direction when said combined signal is lower than a level corresponding to the fully closed position of the by-pass valve and very slowly in a closing motion when said combined signal is higher than the level, said servomotor being also arranged to permit an overriding control from a device which is to raise said bias signal very slowly when said combined signal is lower than a level corresponding to said predetermined partial opening degree, said combined signal therefore being maintained at said predetermined partial opening degree in any equilibrium state and being maintained at substantially the level corresponding to the fully closed position of the by-pass valve during opening motion of the flow regulating means after said combined signal has attained said level.

* * * * *